US007929160B2

(12) United States Patent
Burkes et al.

(10) Patent No.: US 7,929,160 B2
(45) Date of Patent: *Apr. 19, 2011

(54) PAGE PROCESSING AND PRINT ENGINE MANAGEMENT

(75) Inventors: Theresa A. Burkes, Meridian, ID (US); Richard M. Dow, Laramie, WY (US); Chris R. Gunning, Boise, ID (US); Dana A. Jacobsen, Boise, ID (US); Lisa Johnson, Boise, ID (US); Raymond S. Kennedy, Nampa, ID (US); Robert J. Lavey, Siloam Springs, AR (US); Perry Lea, Meridian, ID (US); Scott S. Lee, Meridian, ID (US); John Mauzey, Boise, ID (US); Douglas J. Mellor, Meridian, ID (US); Steven R. Folkner, Boise, ID (US); Randall E. Grohs, Star, ID (US); Terry-Lee M. Fritz, Boise, ID (US); Michael B. Lloyd, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1065 days.

This patent is subject to a terminal disclaimer.

(21) Appl. No.: 10/385,393

(22) Filed: Mar. 10, 2003

(65) Prior Publication Data

US 2004/0179211 A1 Sep. 16, 2004

(51) Int. Cl.
*G06F 15/00* (2006.01)
(52) U.S. Cl. ....... 358/1.15; 358/1.5; 358/448; 358/1.17; 358/1.12; 358/1.14; 358/1.16; 358/1.11; 358/1.13; 358/1.18; 358/1.7

(58) Field of Classification Search .................. None
See application file for complete search history.

(56) References Cited

U.S. PATENT DOCUMENTS

| 5,241,349 | A | * | 8/1993 | Nagasaka | 399/70 |
| 5,521,686 | A | * | 5/1996 | Muto | 399/69 |
| 5,528,346 | A | * | 6/1996 | Kim et al. | 399/33 |
| 5,636,332 | A | * | 6/1997 | Hibino | 358/1.13 |
| 5,913,018 | A | | 6/1999 | Sela | |
| 6,018,400 | A | | 1/2000 | Blair | |
| 6,031,624 | A | | 2/2000 | Murphy | |
| 6,078,343 | A | * | 6/2000 | Jordan | 347/188 |

(Continued)

OTHER PUBLICATIONS

U.S. Appl. No. 10/385,382, filed Mar. 10, 2003, inventors Theresa A. Burkes et al., entitled "Accelerating Printing,".

(Continued)

*Primary Examiner* — Twyler L Haskins
*Assistant Examiner* — Pawandeep S Dhingra (57) ABSTRACT

An exemplary device implementation includes: a manager that is capable of monitoring a process for preparing a page for printing; and a print engine that is capable of printing the page after the process for preparing the page for printing is complete; wherein the device is adapted to temporally overlap the process for preparing the page for printing with preparation of the print engine for printing. An exemplary method implementation includes actions of: beginning processing of a page of a printing job; providing at least one command to a print engine responsive to at least one time remaining estimate for the processing of the page of the printing job prior to completion of the processing of the page of the printing job; and changing a state of the print engine responsive to the providing of the at least one command to the print engine.

9 Claims, 7 Drawing Sheets

U.S. PATENT DOCUMENTS

| | | |
|---|---|---|
| 6,347,852 B1 | 2/2002 | Chen |
| 6,359,642 B1 * | 3/2002 | Smith et al. .................. 347/247 |
| 6,493,100 B1 * | 12/2002 | Endo et al. .................. 358/1.14 |
| 7,212,303 B2 * | 5/2007 | Iida ............................. 358/1.15 |
| 2002/0044300 A1 * | 4/2002 | Oyanagi ..................... 358/1.15 |
| 2003/0035130 A1 * | 2/2003 | Able et al. .................. 358/1.14 |
| 2003/0081242 A1 * | 5/2003 | Simpson et al. ............ 358/1.15 |
| 2003/0081253 A1 * | 5/2003 | Sekiguchi et al. ........... 358/1.16 |
| 2004/0125385 A1 * | 7/2004 | Mellor et al. ................. 358/1.1 |

OTHER PUBLICATIONS

U.S. Appl. No. 10/385,401, filed Mar. 10, 2003, inventors Theresa A. Burkes et al., entitled "Printing Preparation,".

* cited by examiner

PAGE PROCESSING AND PRINT ENGINE MANAGEMENT

BACKGROUND

Printing devices in modern office environments or other document production environments are used for printing in order to effectuate functions such as copying, faxing, printing from a computer or other electronic device, and so forth. For example, a copying function can be effectively accomplished by combining a printing with a scanning function.

The type of print engine used in a printing device can affect various aspects of the printing function. These aspects include speed, durability/upkeep, output quality, and so forth. One print engine type is a laser printer. With laser printers, although output quality is especially high, a period of time is consumed while making the print engine ready for printing, which can affect the speed aspect of printing. The speed aspect may be affected in this regard because a print engine that is maintaining a ready state experiences wear and tear that shortens the useful life of the print engine.

When performing a printing operation, a tradeoff may exist between the time used to complete the printing operation and the incremental wear and tear experienced by the laser printer as a result of the printing operation. For example, steps that are taken to reduce the incremental wear and tear experienced by the laser printer to perform a printing operation may lengthen the time used to perform that printing operation.

SUMMARY

In an exemplary method implementation, a method for page processing and print engine management includes the actions of: beginning processing of a page of a printing job; providing at least one command to a print engine responsive to at least one time remaining estimate for the processing of the page of the printing job prior to completion of the processing of the page of the printing job; and changing a state of the print engine responsive to the providing of the at least one command to the print engine. In an exemplary device implementation, a printing device that coordinates page processing and print engine preparation includes: a manager that is capable of monitoring a process for preparing a page for printing; and a print engine that is capable of printing the page after the process for preparing the page for printing is complete; wherein the printing device is adapted to temporally overlap the process for preparing the page for printing with preparation of the print engine for printing.

BRIEF DESCRIPTION OF THE DRAWINGS

In the Drawings, like numerals are used for like and/or corresponding features, aspects, and components of the various FIGS. 1-9.

DETAILED DESCRIPTION

Figure 1:
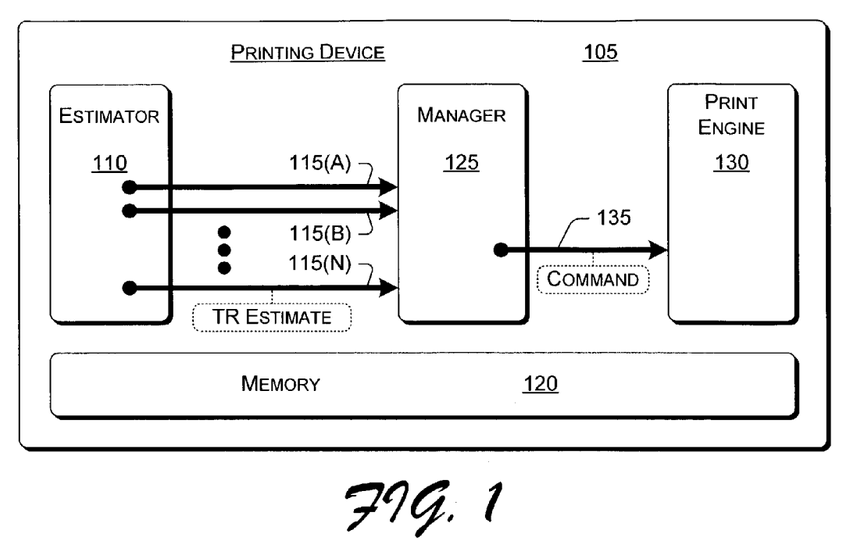
FIG. 1 is an exemplary printing device that includes a manager and a print engine in accordance with exemplary implementation(s) of the invention.

FIG. 1 is an exemplary printing device 105 that includes a manager 125 and a print engine 130. Printing device 105 also includes an estimator 110 and memory 120. In a described implementation, manager 125 manages, at least in part, print engine 130. Estimator 110 is capable of providing one or more time remaining (TR) estimates 115(A), 115(B) . . . 115(N). These time remaining estimates 115 are provided to manager 125.

Manager 125 uses time remaining estimates 115 in an analysis along with certain characteristics of print engine 130. The analysis produces at least one command 135 that is provided from manager 125 to print engine 130. This command 135 changes and/or sets a state of print engine 130. Printing throughput for printing device 105 is maximized, or at least increased, while wear and tear on print engine 130 is minimized, or at least reduced, through the management of print engine 130 by manager 125.

Characteristics, including different states, of print engine 130 are described further below especially with reference to FIG. 3. Commands 135 to which print engine 130 is receptive are also described further below especially with reference to FIG. 3. Exemplary implementations and uses of memory 120 are described further below especially with reference to FIGS. 2, 6, 8, and 9.

Time remaining estimates 115 relate to an expected time remaining until a page of a printing job has been processed such that it is prepared for printing. For example, a page to be printed may be processed by formatting it so that print engine 130 is capable of printing the page. Time remaining estimates 115 are received at manager 125 from estimator 110.

Estimator 110 ascertains time remaining estimates 115 by receiving them from another component or by determining them from information. The other component or the information depends, for example, on the source of the page to be printed. Time remaining estimates 115 may reflect the time to format a page, the time to download a page, the time to scan a page, the time for a user to enter options, etc. depending on the application. For example, if the page is being downloaded, time remaining estimates 115 may be received from the local or remote computer that is the source of the page being downloaded, or time remaining estimates 115 may be determined using a provided memory size of the page and a known bandwidth for the downloading. Other means for ascertaining time remaining estimates 115 may be utilized, including those described further below.

Estimator 110 provides manager 125 with the one or more time remaining estimates 115. If there are multiple such time remaining estimates 115, then they may each be associated with a single page such that non-initial time remaining estimates 115 are updates of an initial time remaining estimate 115. Alternatively, they may each be associated with a different page of a multiple page printing job. Although estimator 110 is illustrated as being separate from manager 125, it may instead be part of manager 125.

Manager 125 receives the one or more time remaining estimates 115 from estimator 110. Manager 125 uses time remaining estimates 115 to at least partly manage print engine 130. Manager 125 is capable of comparing time remaining estimates 115 to characteristics of print engine 130, including a state thereof, in order to determine in which state print engine 130 should be set and/or switched to. For example, if print engine 130 is currently in an idle state and a time remaining estimate 115 indicates that a page will be processed and ready for printing in approximately the amount of time that print engine 130 consumes when readying for printing, then manager 125 issues a command 135 that causes print engine 130 to spin up. Accordingly, a readiness state of print engine 130 may be synchronized with the completion of processing for printing preparation of one or more pages.

Estimator 110 and manager 125 may be comprised of hardware, software, firmware, etc., as well as any combination thereof, as part of printing device 105. For example, manager 125 may be comprised of a formatter for printing device 125. In such an implementation, manager 125 may be realized as a formatting board. Similarly, estimator 110 may be a separate board, part of such a formatting board, purely software (e.g., stored in memory 120), and so forth.

Memory 120 may be comprised of multiple different types of memory or only a single type of memory. Also, memory 120 may be used only to support a printing function of printing device 105, or it may be shared by multiple components and used to support multiple functions of the device. Although only one each of components 110, 120, 125, and 130 are shown in FIG. 1, there may be multiple ones of any one or all of these components.

Figure 2:
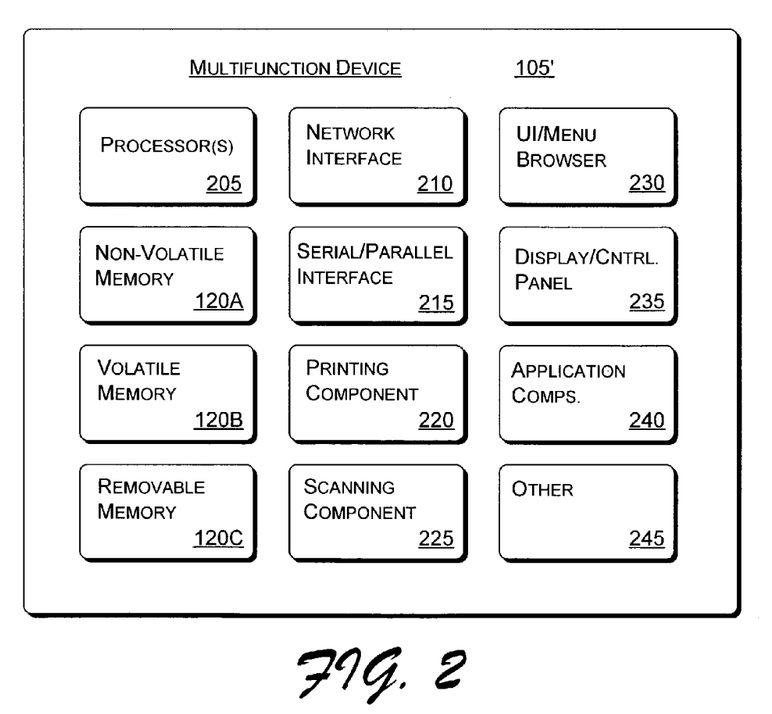
FIG. 2 is a multifunction device implementation of a printing device that illustrates exemplary components thereof in accordance with exemplary implementation(s) of the invention.

FIG. 2 is a multifunction device 105' implementation of a printing device 105 that illustrates exemplary components 120A-C and 205-245. Thus, printing device 105 may comprise a multifunction device 105' when printing device 105 also includes other functions beyond printing. For example, multifunction device 105' may be capable of performing two or more functions such as printing, copying, scanning, faxing, electronic document transmission by other means, and so forth. Hence, in such an implementation, multifunction device 105' may include a printing unit, a scanning unit, a faxing unit, a network communication unit, and so forth. It should be noted that a scanning function and a printing function may be combined to accomplish a copying function.

Any particular multifunction device implementation 105' need not include most, much less all, of the exemplary components 120A-C and 205-245. Nevertheless, in the described implementation of FIG. 2, multifunction device 105' includes one or more processors 205, non-volatile memory 120A, volatile memory 120B, and removable memory 120C. Processor(s) 205 process various instructions to control the operation of multifunction device 105' and to communicate with other electronic and/or computing devices. Memories 120A, 120B, and/or 120C may store these instructions, as well as other information and data such as that for scanning, copying, faxing, and/or printing.

Non-volatile memory 120A may include read-only (non-erasable) memory (ROM), flash memory, programmable read-only memory (PROM), electrically programmable read-only memory (EPROM), electrically erasable programmable read-only memory (EEPROM), some other non-volatile (e.g., solid state) memory, and so forth. Non-volatile memory 120A may also include a mass memory such as a disk-based storage system. Regardless, non-volatile memory 120A may store boot-level/initialization code, basic identification, information supportive of one or more functions of multifunction device 105', and/or alterable or unalterable operational information such as firmware, and so forth.

Volatile memory 120B is typically a random access memory (RAM). Volatile memory 120B holds information that is needed on a transient basis such as printing, faxing, copying, or scanning data; current processing instructions; pages in an electronic form for current manipulation/transmission; and so forth. Removable memory 120C may include a floppy drive, a removable hard drive, a removable flash memory cartridge/module, a proprietary format (e.g., a ZIP® drive), and so forth. Removable memory 120C may hold document/page information, new or revised instructions/firmware, and so forth.

Multifunction device 105' also includes a network interface (e.g., adapter) 210, and a serial and/or parallel interface (e.g., adapter) 215. Network interface 210 may provide a connection between multifunction device 105' and a data communication network (or a specific device connected over a network-type medium). Network interface 210 allows devices coupled to a common data communication network to send print jobs, faxes, and other information to multifunction device 105' via the data communication network. Similarly, serial and/or parallel interface 215 may provide a data communication path directly between multifunction device 105' and another electronic and/or computing device. Multifunction device 105' may alternatively substitute or add another interface adapter type, such as a Universal Serial Bus (USB) interface adapter, an IEEE 1394 ("Firewire") interface adapter, a wireless interface (e.g., Bluetooth®, IEEE 802.11, wireless Local Area Network (LAN), etc.) adapter, and so forth.

Multifunction device 105' also includes a printing component 220 that typically includes one or more mechanisms arranged to selectively apply pigment (e.g., toner) to a print media such as paper, plastic, fabric, and the like in accordance with print data corresponding to a print job. Examples of such print jobs include those print jobs arriving via a scanning component 225 (e.g., possibly to support a copying function), via serial and/or parallel interface 215, via network interface 210, and so forth.

Printing component 220 may include, for example, a laser printing mechanism that selectively causes toner to be applied from toner container(s)/cartridge(s) to an intermediate surface of a drum or belt that spins. The intermediate surface can then be brought into the proximity of a print media in a manner that causes the toner to be transferred to the print media in a controlled fashion. The toner on the print media can then be more permanently fixed to the print media, for example, by selectively applying thermal energy to the toner. Alternatively, printing component 220 may include an ink jet printing mechanism that selectively causes liquid ink to be extracted from ink container(s) and ejected through print head nozzles and onto print media to form an intended pattern (e.g., text, pictures, etc.). Hence, printing component 220 may include print engine 130, manager 125, and/or estimator 110 (of FIG. 1).

Printing component 220 may also be designed or configured to support duplex printing, for example, by selectively flipping or turning the print media as required to print (including to copy) on both sides. There are many different types of printing units available, and printing component 220 may be comprised of any one or more of these different types. Although not explicitly shown, a system bus or busses (or other communication links) may connect and interconnect the various illustrated components 120A-C and 205-245 of multifunction device 105'. For example, one or more communication links may exist between (i) printing component 220 and (ii) interfaces 210 and 215 and/or scanning component 225.

Multifunction device 105' thus includes scanning component 225 that can be implemented as an optical or other scanner to produce machine-readable/understandable image data signals that are representative of a scanning target, such as a photograph, a page of printed text, an object, and so forth. The image data signals produced by scanning component 225 can be used to reproduce an image of the scanning target, such as on a computer monitor or print media (e.g., via printing component 220).

Multifunction device 105' may also include a user interface (UI) and/or menu browser 230 and a display and/or control panel 235. The UI and/or menu browser 230 allows a user of multifunction device 105' to navigate the device's menu structure (if any). A display aspect of display and/or control panel 235 may be a graphical and/or textual display that provides information regarding, e.g., the status of multifunction device 105' and the current options available to a user through, e.g., a menu structure. Any such graphical and/or textual display may be realized using a liquid crystal display (LCD) screen, a cathode ray tube (CRT) screen, a plasma screen, a light emitting diode (LED) screen, a video screen, and so forth. A control aspect of display and/or control panel 235, on the other hand, may be composed of indicators and/or a series of buttons, switches, or other selectable controls that are manipulated by a user of multifunction device 105'.

Multifunction device 105' may, and typically does, include application components 240 that provide a runtime environment in which software applications or components can run or execute. There are many different types of available runtime environments, which facilitate the extensibility of multifunction device 105' by allowing various interfaces to be defined that, in turn, allow application components 240 to interact with multifunction device 105'. Other components, whether comprised of hardware, software, firmware, or some combination thereof, may also be part of multifunction device 105', as indicated by the other block 245. For example, multifunction device 105' may include a faxing component.

Figure 3:
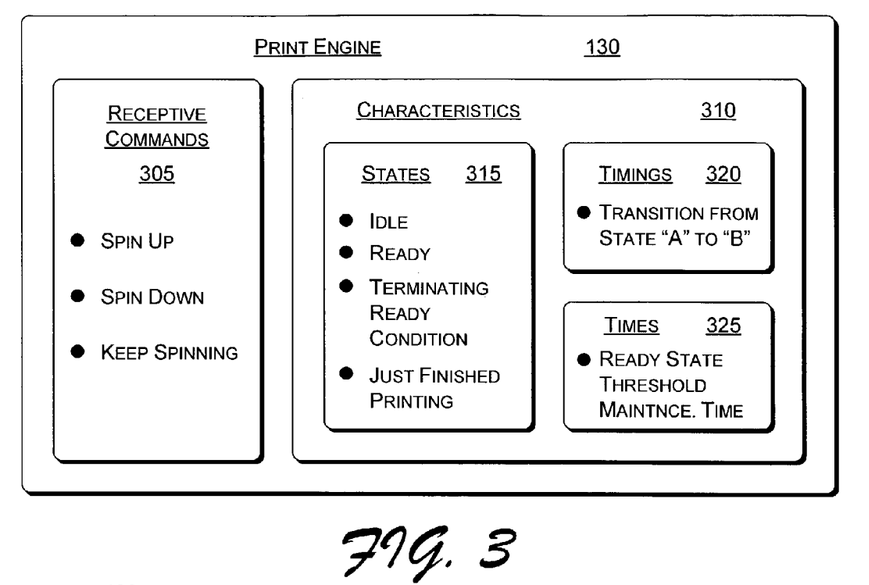
FIG. 3 is a print engine that illustrates exemplary aspects thereof in accordance with exemplary implementation(s) of the invention.

FIG. 3 is a print engine 130 that illustrates exemplary aspects thereof. Print engine 130 includes the mechanics, the laser (if it is a laser printer), etc. that are used by print engine 130 to render images on media for printing device 105. Print engine 130 is associated with multiple aspects thereof such as one or more receptive commands 305 and one or more characteristics 310. These characteristics 310 include print engine states 315, print engine timings 320, print engine times 325, and so forth.

Receptive commands 305 include a spin up/initialize command, a spin down/terminate or cease spinning command, and a keep spinning/continue spinning command. These commands may be sent from manager 125 (of FIG. 1) to print engine 130 as command 135 in order to effect an establishment of a desired state of print engine 130. These various states 315 are described below in the context of characteristics 310 of print engine 130.

In a described implementation, print engine 130 may be considered to be in one of multiple print engine states 315. These states 315 include active and inactive states, four of which are shown in FIG. 3. These four noted states are: idle, ready, terminating-a-ready-condition, and just-finished-printing. However, print engine 130 may not be capable of being in all of the four noted states, and it also may be capable of being in other states.

An inactive state refers to when print engine 130 is neither ready nor terminating-a-ready-condition, such as the idle state. An active state refers to when print engine 130 is in either a ready-to-print state or in a terminating-a-ready-condition state. The just-finished-printing state may be considered a transitional or an active state, depending on whether print engine 130 has spun down. In other words, print engine 130 is not spinning when it is in an idle state 315; print engine 130 is spinning when it is in a ready state 315; and print engine 130 is spinning down when it is in a terminating-a-ready-condition state 315.

As described above, there is a period of time that is consumed when taking print engine 130 from an idle state 315 to a ready state 315. This period of time is consumed by, for example, the following processes: warming up the fuser, cleaning, calibration, and so forth. There is also a period of time consumed when taking print engine 130 from a terminating-a-ready-condition state 315 back to a ready state 315. Because there is usually at least a moment in which a print engine is at an inactive (or idle) state 315 when moving from a terminating-a-ready-condition state 315 back to a ready state 315, there is a consequentially even longer period of time to take print engine 130 from the terminating-a-ready-condition state 315 back to the ready state 315.

Another characteristic 310 of print engine 130, in addition to print engine states 315, is print engine timings 320. These print engine timings 320 relate to the time period(s) that are consumed when changing/transitioning from state "A" to state "B", where states "A" and "B" refer to the various states 315. For example, print engine 130 may take "X" seconds, "Y" milliseconds, etc. to move from an idle state 315 to a ready state 315. These engine timings 320 may include details regarding sub-activities undertaken by print engine 130 in order to switch states. An example of such a sub-activity is the warming up of the fuser when switching to a ready state 315. Timings 320 for print engine 130 may also relate to other timings regarding the operation of print engine 130 in addition to those regarding the transitioning between and among print engine states 315.

Another characteristic 310 of print engine 130, in addition to print engine states 315 and print engine timings 320, is print engine times 325. Print engine times 325 relate to variable threshold times that are set in order to manage print engine 130. For example, the ready state threshold maintenance time, as shown in FIG. 3, refers to the length of time that print engine 130 may remain spinning without causing undue or non-preferred wear and tear on the print engine. In other words, the ready state threshold maintenance time is selected so as to balance throughput (and thus user-perceived speed and responsiveness) against wear and tear (and thus print engine life and long-term cost of ownership). This particular threshold may be set at the factory, adjustable or establishable after installation, user selectable, some combination thereof, and so forth. Other threshold times 325 may also be associated with print engine 130.

Print engine 130 may communicate characteristics 310 (e.g., any of states 315, timings 320, and times 325) to manager 125. Such communication may occur once by way of specification and/or repeatedly via real-time, dynamic status updates. Manager 125 may alternatively be furnished any or all of these characteristics 310 (and/or available receptive commands 305) by way of specification from another source, either during manufacturing or thereafter. Manager 125 may further be given the ability to model print engine states 315, print engine timings 320, and print engine times 325, as well as interrelationships between or among them.

Implementations of print engine management during page processing may be described in the general context of electronically-executable instructions. Generally, electronically-executable instructions include routines, programs, objects, components, data structures, and the like that perform particular functions or implement particular abstract data types. Page processing and print engine management implementations may also be effectuated in distributed environments where functions are performed by components that are remote from each other but are connected through a communications link. Especially in such distributed environments, electronically-executable instructions may be located in both local and remote storage media, as well as in signals extant on one or more transmission media.

The methods, processes, and approaches of FIGS. 4, 5, and 7-9 are illustrated in flow diagrams that are divided into multiple blocks. However, the order in which they are described is not intended to be construed as a limitation, and any number of the described blocks can be combined in any order to execute one or more methods, processes, and approaches for print engine management during page processing. Furthermore, although the methods, processes, and approaches of FIGS. 4, 5, and 7-9 are described below with reference to printing device 105/multifunction device 105' and FIGS. 1-3 and 6 where applicable, they can be implemented in any suitable hardware, software, firmware, or combination thereof and using any appropriate printing or other component(s).

Figure 4:
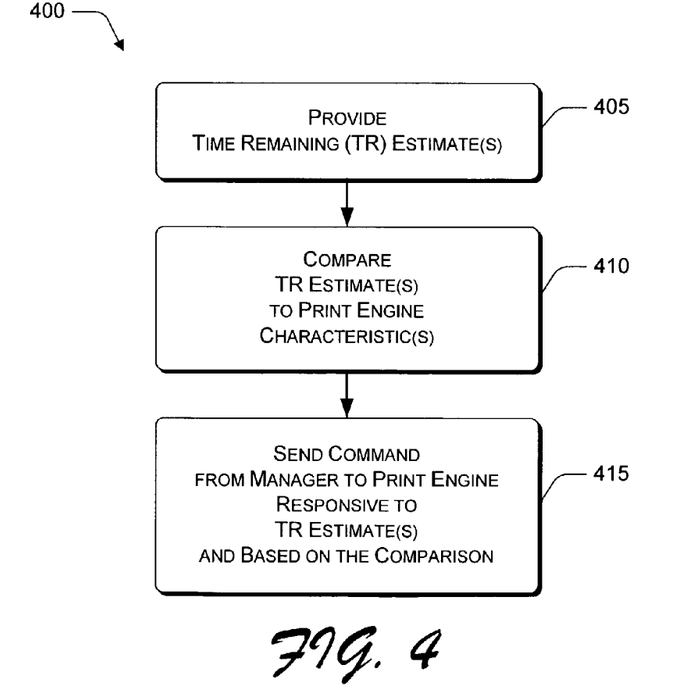
FIG. 4 is a flow diagram that illustrates an exemplary general method for managing a print engine during page processing in accordance with exemplary implementation(s) of the invention.

FIG. 4 is a flow diagram 400 that illustrates an exemplary general method for managing a print engine 130 during page processing. In other words, flow diagram 400 illustrates an implementation of how a printing function can be expedited while wear and tear is reduced by tuning print engine management and increasing inter-component communication. Flow diagram 400 includes three (3) method blocks 405-415 that occur during operation of a printing function.

At block 405, one or more time remaining (TR) estimates are provided. For example, time remaining estimates 115 (of FIG. 1) may be provided to an estimator 110 from an un-illustrated component and/or time remaining estimates 115 may be provided from the estimator 110 to a manager 125.

At block 410, the one or more time remaining estimates are compared to one or more print engine characteristics. For example, the manager 125 can compare the time remaining estimates 115 to one or more print engine characteristics 310 (of FIG. 3). The print engine characteristics 310 may include one or more of print engine states 315, print engine timings 320, and print engine times 325.

At block 415, a command is sent from a (e.g., print engine) manager to a print engine responsive to the time remaining estimates and based on the comparison (of block 410). For example, a command 135 may be sent from the manager 125 to the print engine 130. As is described further below especially with reference to FIG. 5, the command 135 may be comprised of a spin up command, a spin down command, a keep spinning command, and so forth. For example, a spin up command may be sent to the print engine 130 when the print engine 130 is in a non-ready state 315 and the transition time 320 to become ready equals or exceeds the estimated time remaining 115 to complete the processing of the page for printing.

In general, a spin up command can be applicable to the printing of any page of a printing job, including a first page thereof. This first page may also be the only page of the printing job. On the other hand, a spin down command or a keep spinning command is typically applicable to the printing of non-first pages of a printing job, including the second and subsequent pages thereof. However, a spin down command or a keep spinning command can be applicable to the printing of a first page of a printing job when, for example, the first page of the printing job follows shortly after a previous printing job.

Figure 5:
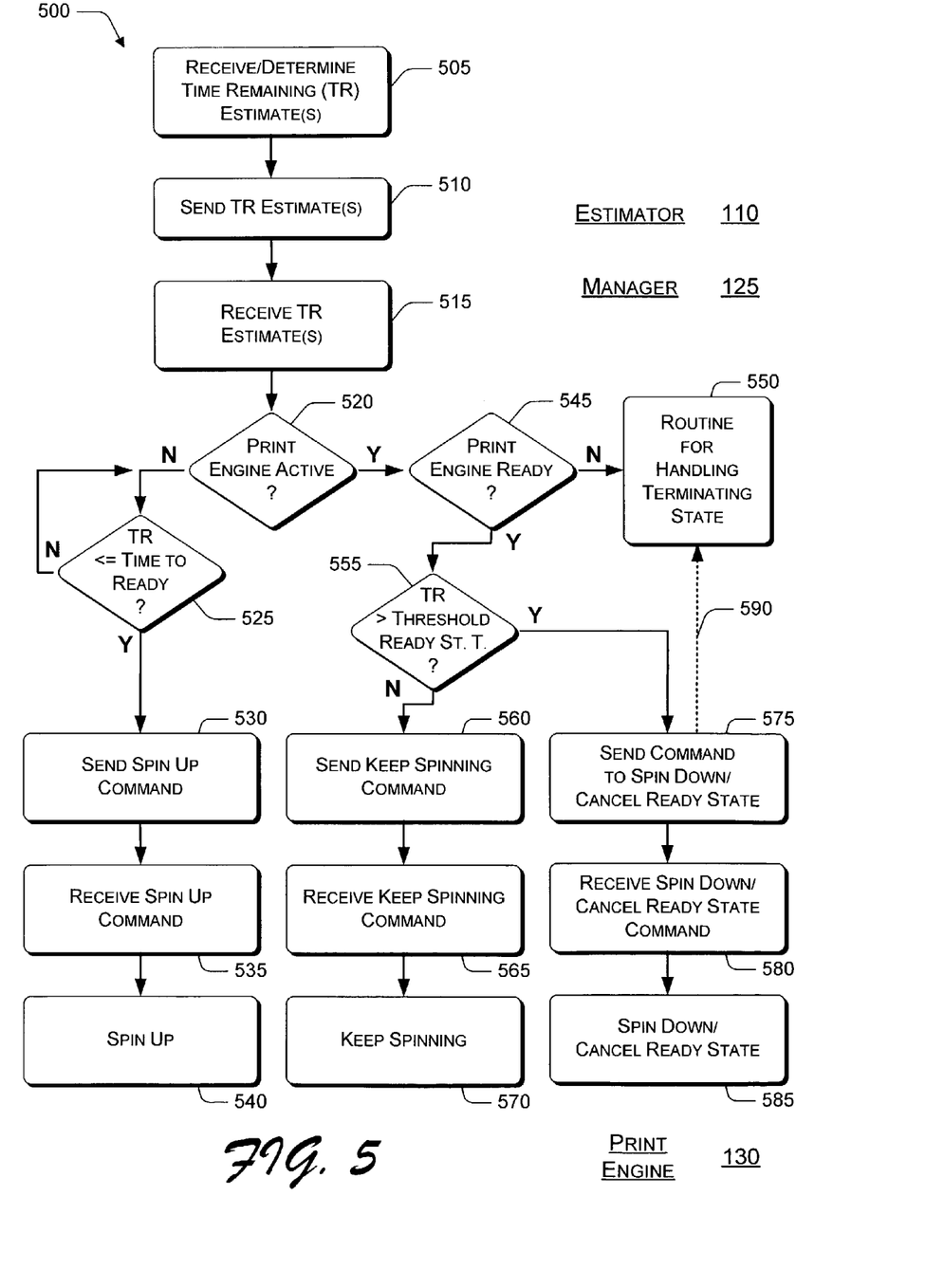
FIG. 5 is a flow diagram that illustrates an exemplary specific method for managing a print engine during page processing in accordance with exemplary implementation(s) of the invention.

FIG. 5 is a flow diagram 500 that illustrates an exemplary specific method for managing a print engine 130 during page processing. Flow diagram 500 includes seventeen (17) method blocks 505-585. The actions of flow diagram 500 may be effectuated by any appropriate components of printing device 105. However, in a described implementation, an estimator 110 executes actions for blocks 505 and 510; a manager 125 executes actions for blocks 515, 520, 525, 530, 545, 550, 555, 560, and 575; and the print engine 130 executes actions for blocks 535, 540, 565, 570, 580, and 585.

At block 505, one or more time remaining (TR) estimates are received or determined. At block 510, the time remaining estimates are sent. At block 515, the time remaining estimates are received. These time remaining estimates are transmitted between the estimator 110 and the manager 125.

At block 520, it is determined whether the print engine is active. If not, then at block 525 it is determined whether the applicable time remaining estimate is less than or equal to the time that is consumed to ready the print engine for printing. The applicable time remaining estimate is selected from the multiple time remaining estimates by selecting the current time remaining estimate and/or the time remaining estimate that is associated with the next page to be printed.

If the applicable time remaining estimate is not less than or equal (as determined at block 525), then the method is in a holding pattern that repeats block 525 until the applicable time remaining estimate falls to or below the time period consumed when spinning up the print engine. When the applicable time remaining estimate is or becomes less than or equal to the time to ready the print engine (at block 525), flow continues to block 530. This can occur because a sufficient period of time has elapsed and/or because a new updated time remaining estimate has been received at the manager 125 from the estimator 110.

At block 530, a spin up command is sent from the manager 125. At block 535, the spin up command is received at the print engine 130. At block 540, the print engine 130 spins up to initialize and thereby prepare itself for printing.

If, on the other hand, the print engine is active (as determined at block 520), flow continues to block 545. At block 545, it is determined whether the active print engine is in a ready state. If not, then at block 550 a routine for handling the print engine in a terminating-a-ready-condition state is executed. In such a routine, manager 125 may immediately begin considering engine timings that include the remaining time to complete a spinning down of the engine, or manager 125 may wait until the print engine state becomes inactive/idle, in which case flow diagram 500 may then continue at block 525. Other options may alternatively be implemented for this routine.

If, on the other hand, the print engine is ready (as determined at block 545), flow continues to block 555. At block 555, the applicable time remaining estimate is compared to a threshold ready state maintenance time (e.g., a threshold spinning time) to determine whether the applicable time remaining estimate exceeds the threshold ready state maintenance time. This threshold ready state maintenance time reflects the maximum time it is prudent to keep the print engine spinning while waiting for page processing completion of the next page. The threshold ready state maintenance time may be adjusted to account for operator preferences regarding the tradeoffs between optimizing throughput and improving print engine longevity.

If the applicable time remaining estimate does not exceed the threshold ready state maintenance time (as determined at block 555), flow continues to block 560. At block 560, a keep spinning command is sent from the manager 125. At block 565, the keep spinning command is received at the print engine 130. At block 570, the print engine 130 keeps spinning in a ready state so as to be prepared to print the next page upon completion of the processing thereof.

If, on the other hand, the applicable time remaining estimate does exceed the threshold ready state maintenance time (as determined at block 555), flow continues to block 575. At block 575, a command to spin down/cancel a ready state is sent from the manager 125. At block 580, the command to spin down/cancel a ready state is received at the print engine 130. At block 585, the print engine 130 cancels its ready state by spinning down.

As indicated by dashed arrow 590, the routine at block 550 for handling the print engine when it is in a terminating-a-ready-condition state may be executed by the manager 125 after sending the command to spin down. This routine may vary depending on whether it is executed as a result of block 545 or as a result of block 575.

Furthermore, instead of the actions of blocks 575-585, no command may be sent from the manager 125 to the print engine 130 so that the print engine 130 spins down on its own accord and at its own specified/programmed time. This specified/programmed time may be, for example, a time-out spin-down time 325. Such a time-out spin-down time 325 is likely, but not necessarily, shorter than a threshold ready state maintenance time 325.

Figure 6:
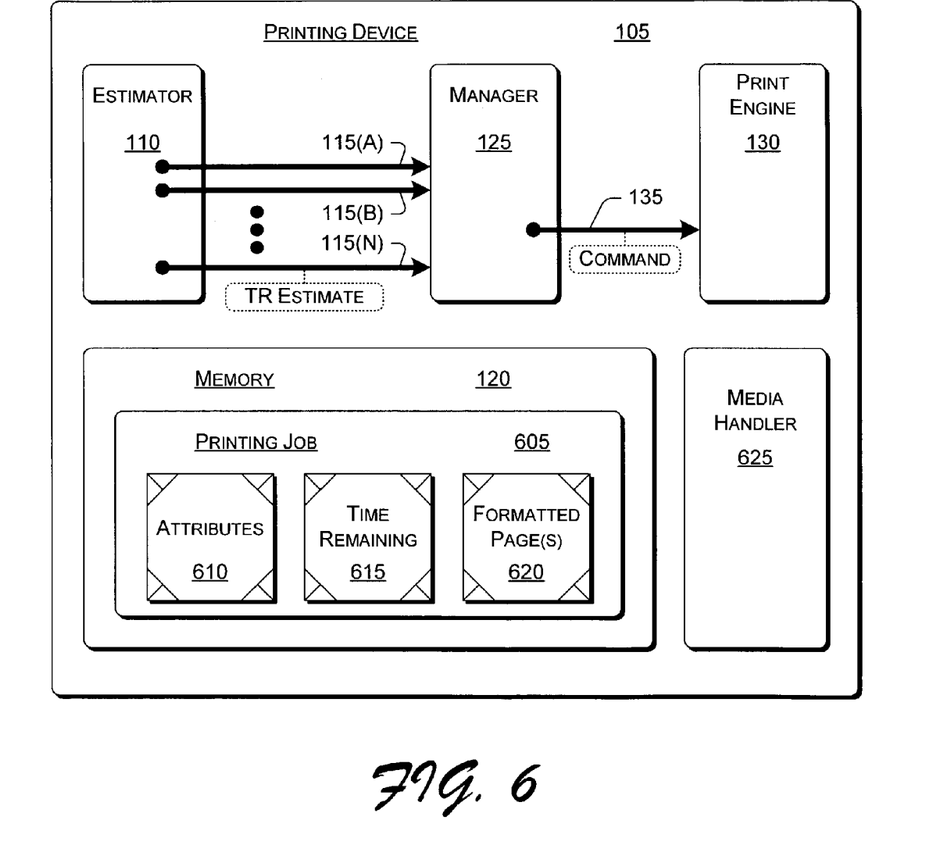
FIG. 6 illustrates an exemplary approach to managing a print engine and/or a media handler of a printing device during page processing in accordance with exemplary implementation(s) of the invention.

FIG. 6 illustrates an exemplary approach to managing a print engine 130 and/or a media handler 625 of a printing device 105 during page processing. In this exemplary approach, a printing job 605 is being worked on using manager 125 and print engine 130. Printing device 105 is adapted to overlap preparing a page for printing and managing a print engine and/or a media handler. For example, page processing may be ongoing while decisions are made as to whether print engine 130 should spin up, spin down, or continue spinning.

Estimator 110 is capable of receiving or calculating the estimated time remaining until page processing is completed and the page is ready to print. Estimator 110 monitors the progress of getting a page ready (e.g., time to format, time to download, time to scan, time for user to enter options, etc., depending on the application). Based on the page preparation progress, estimator 110 sends or otherwise provides time remaining estimates 115, which optionally include update(s) of the estimates, to manager 125.

Manager 125 controls and/or oversees print operations of printing device 105. Manager 125 accepts and analyzes time remaining estimates 115, including any time remaining update estimates 115, to produce at least one command 135. Examples of command 135 include spin up, spin down, and keep spinning commands. These analyses by manager 125 may be made in real-time. In other words, manager 125 acts as a real-time decision maker that makes decisions based on the expected readiness of the page (e.g., from time remaining estimates 115), the current state of the engine (e.g., of print engine states 315), engine timings (e.g., from print engine timings 320), and/or engine wear and tear times (e.g., from print engine times 325). The decisions are made so as to balance printing time against undue wear and tear on print engine 130.

For example, if print engine 130 is currently spinning and another page is expected to be ready within a time period threshold 325 that will not cause undue wear and tear on print engine 130, manager 125 sends a command 135 to print engine 130 to keep spinning. If, on the other hand, another page is not expected to be ready within such a threshold time 325, then manager 125 sends a command 135 to print engine 130 to terminate spinning, or manager 125 allows print engine 130 to spin down within its own threshold time-out waiting time 325. Because of the intelligent and flexible analysis performed by manager 125, this threshold time-out waiting time 325 may be unusually short. Also, if print engine 130 is idle, then when a page is expected to be ready for printing within the normal timing 320 for warming up/initializing print engine 130, manager 125 issues a command 135 to print engine 130 to start spinning.

Printing job 605 is among those printing operations of printing device 105 that are controlled and/or overseen by manager 125. Printing job 605 is stored in memory 120 and is accessible by manager 125 and optionally by print engine 130 and/or estimator 110. Printing job 605 includes one or more attributes 610, at least one time remaining estimate 615, one or more formatted pages 620, and so forth.

Attributes 610 may include both job attributes that pertain to the entire printing job 605 and page attributes that pertain primarily to individual pages of printing job 605. Attributes 610, for both the job and the individual pages thereof, are described further below with reference to FIG. 7.

Stored time remaining estimate(s) 615 may be a single estimate for a single page, a single different estimate for each page of multiple pages, one or more time remaining update estimates for either scenario, some combination thereof, and so forth. The estimate(s) represent an expected time until the page will be fully processed and ready for printing. Time remaining estimates 615 are monitored by manager 125 in order to manage the states of print engine 130, especially with respect to being ready for printing when a page is ready to be printed.

Time remaining estimates 115 may be provided to manager 125 from estimator 110 using any of a number of options. For example, time remaining estimates 115 may be directly passed to manager 125 from estimator 110. Alternatively, time remaining estimates 115 may be stored in memory 120 at printing job 605 as time remaining estimates 615 by estimator 110 and accessed therefrom by manager 125. Other options may also be employed.

Formatted pages 620 are post-processed printing data that are prepared by, e.g., a formatter (not explicitly shown in FIG. 6). Such a formatting function may be accomplished by manager 125 or another component or components of printing device 105. When all lines/strips or when all of any other definable portion of a page have been processed by formatting them into a formatted page 620, then the page is ready to be printed by the hardware of print engine 130. It should be noted that "page" refers to any relevant whole or part of a printable media item, and it is not limited to a sheet of paper.

Printing device 105 may also include one or more media handlers 625, as illustrated in FIG. 6. Media handlers 625 are optional devices of printing device 105 that provide for a greater array of media types and/or post-printing media manipulation. For example, media handlers 625 may support a greater range of input media options, such as colored media, different sized media, non-paper media, and so forth. Also, media handlers 625 may support a greater range of output processes, such as stapling, sorting, stacking, mail boxes, and so forth.

When such media handler(s) require preparation time before they can perform their intended function and/or before a printing job can be commenced or completed, then manager 125 (or another component) may mange them such that page readiness may be coordinated with the time required to prepare the media handler(s). This management of media handlers 625 by manager 125 can be performed along with or separately from management of print engine 130. Thus, manager 125 may also be capable of sending one or more commands 135 to media handlers 625.

Figure 7:
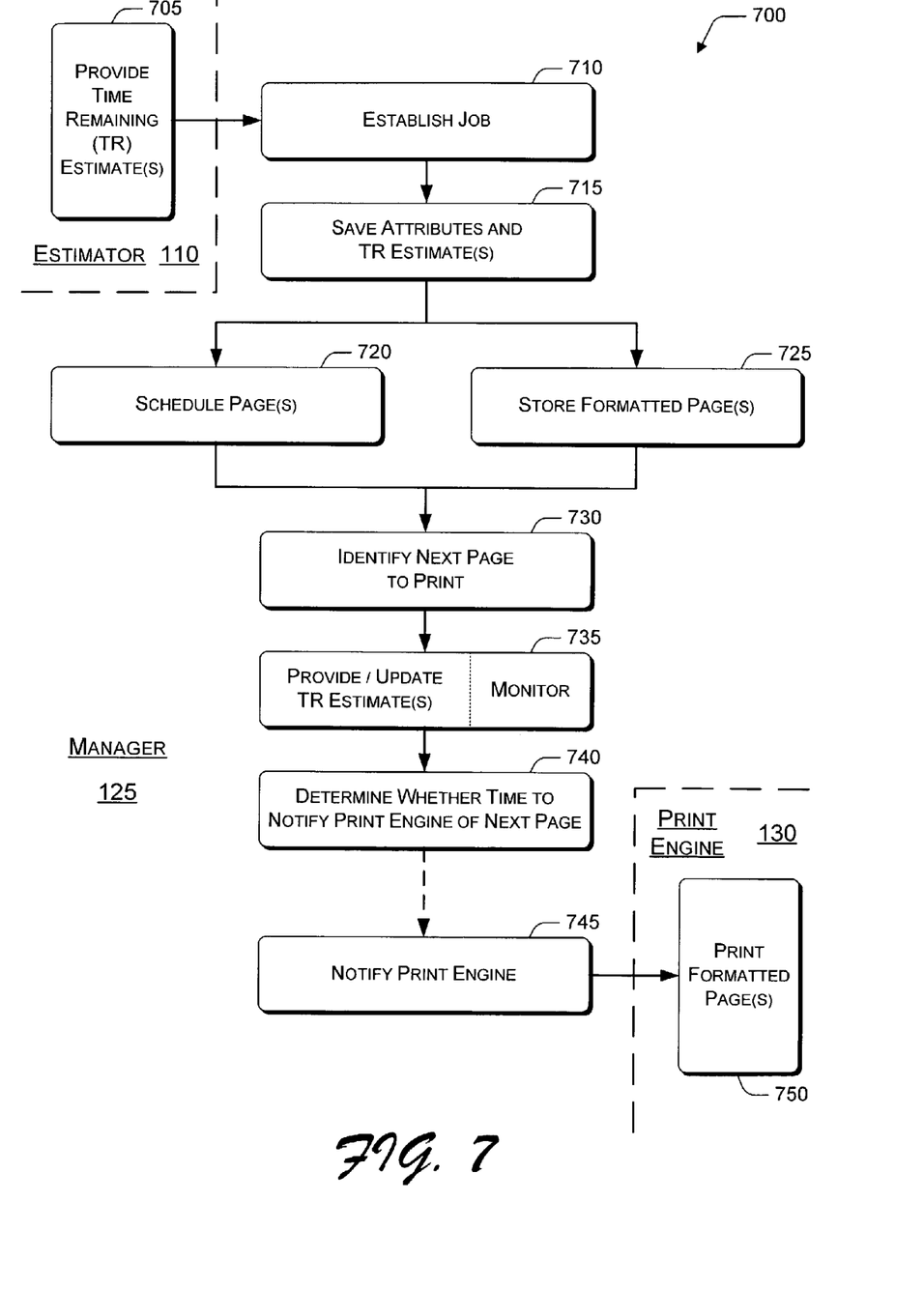
FIG. 7 is a flow diagram that illustrates another exemplary specific method for managing a print engine during page processing in accordance with exemplary implementation(s) of the invention.

FIG. 7 is a flow diagram 700 that illustrates another exemplary specific method for managing a print engine 130 during page processing. Flow diagram 700 includes ten (10) blocks 705-750. Blocks 705-750 are implemented by three components of a printing device 105. Specifically, an estimator 110 implements the action(s) of block 705, a manager 125 implements the actions of blocks 710-745, and the print engine 130 implements the action(s) of block 750.

At block 705, one or more time remaining (TR) estimates are provided. For example, time remaining estimates 115 (for a printing job) are sent from the estimator 110 to the manager 125. At block 710, a printing job is established. For example, a printing job 605 is initialized and stored in a memory 120 of the printing device 105. The estimator 110 may actually provide the time remaining estimates 115 to the manager 125 before, during, or after the printing job 605 is established or is being established.

At block 715, attributes of the printing job and one or more time remaining estimates until the first/next page is processed and ready to print are saved. For example, the manager 125 stores attributes 610 and time remaining estimates 615 in association with the printing job 605 at the memory 120. Printing job attributes can be job-level attributes, page-level attributes, and so forth. Examples of job-level attributes include total number of pages (if available), number of collated copies, and so forth. Examples of page-level attributes include duplex/simplex, media type (including a size thereof), media handling (including input tray source, output slot or tray destination, special features, etc.), color requirements, and so forth. Other attributes may also be specified.

At block 720, one or more pages are scheduled. For example, the manager 125 schedules a page that is being processed (e.g., formatted, downloaded, etc.) on a queue for printing. At block 725, formatted versions of the pages are stored. For example, formatted pages 620 may be saved in association with the printing job 605 at the memory 120 by the manager 125. The formatted pages 620 are capable of being directly printed by the print engine 130.

If pages that are received for printing by the manager 125 are not already in a printable format, then manager 125 can format or cause to be formatted these pages. For example, a printable format may be attained by processing the pages into bit-level printable strips via a formatting operation. The actions of block 725 may occur before, after, or fully or partially during the actions of block 720. In a described implementation, however, all or parts of at least some pages are not fully processed or stored as formatted pages 620 prior to scheduling such pages.

At block 730, the next page to print is identified. For example, the first page of a printing job or the next page on a queue of pages to be printed is identified. At block 735, a time remaining estimate is provided for this next page, and this time remaining estimate is monitored. This time remaining estimate may be updated or may itself be an updated time remaining estimate. For example, the time remaining estimate may be monitored by setting a timer that counts down the time period of the time remaining estimate, by noting a current time in order to make subsequent comparisons of the time period of the time remaining estimate to a difference between the current time and an updated current time, and so forth.

At block 740, whether or not it is time to notify the print engine of the next page is determined. For example, the manager 125 makes such a determination by making one or more analyses with respect to the time remaining estimate until the next page is ready to print, a current state of the print engine 130, timing(s) of the print engine 130, threshold time(s) of the print engine 130, one or more job-level and/or page-level attributes of the printing job, the position of the printing job in a job stream, the position of the page on a page queue, some combination thereof, and so forth. Exemplary implementations of a job stream and a page queue are described further below with reference to FIGS. 8 and 9.

As an example, it may be determined to be time to notify print engine 130 so that print engine 130 may begin initializing when print engine 130 is currently inactive and the monitored time remaining (from a time remaining estimate or updated estimate) for the next page is at or drops below a print engine timing period for spinning up from such an inactive state. Consequently, print engine 130 may be ready for printing when the page is ready and fully processed without print engine 130 being in a ready condition significantly beforehand, if at all.

At block 745, when the analysis of block 740 determines that it is time to notify the print engine, the print engine is notified to begin preparing for printing. The notification may be sent from the manager 125 to the print engine 130 as a command 135. Also, in implementations with media handlers, one or more of the media handlers may be similarly notified that it is time to begin preparations for media handling. The dashed flow arrow between blocks 740 and 745 indicates that the actions of block 745 may be effectuated asynchronously with respect to the actions of blocks 710-740.

In response to the notification (of block 745), the print engine 130 begins to prepare for printing. As a result, the print engine 130 reaches a ready state at approximately the same time as the entirety of the next page is formatted. This formatted page may optionally be provided to the print engine 130 from the manager 125. It may be provided by transmitting the bit-level level version of the next page from the manager 125 to the print engine 130, by enabling the print engine 130 to access the memory 120 and retrieve the formatted pages 620 from the printing job 605, and so forth. At block 750, the formatted page is printed. For example, the print engine 130 renders the image data of the formatted pages 620 on some physical media.

Figure 8:
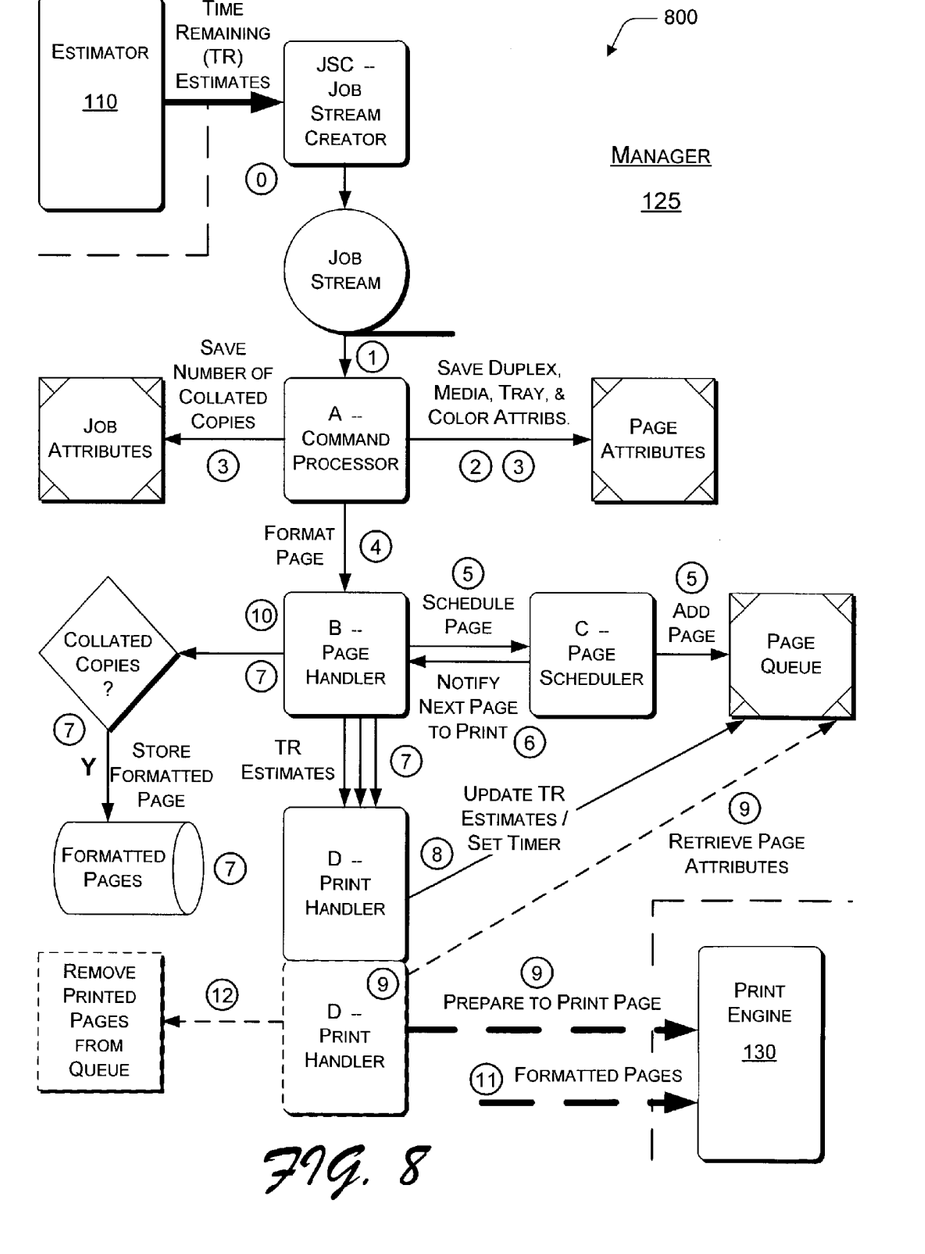
FIG. 8 is a flow diagram that illustrates an exemplary approach to managing a print engine during page processing when printing a first page of a printing job in accordance with exemplary implementation(s) of the invention.

FIG. 8 is a flow diagram 800 that illustrates an exemplary approach to managing a print engine 130 during page processing when printing a first page of a printing job. Flow diagram 800 shows multiple components of printing device 105, including an estimator 110, a manager 125, and the print engine 130. Manager 125 is itself illustrated as having multiple components. The encircled numerals (0) through (12) indicate and facilitate reference to specific aspects of the described mechanism.

The multiple components of manager 125 include executable-type components, data structure-type components, mass memory storage-type components, data flow-type components, and so forth. Each of these components is described further below. The executable-type components include first, second, third, fourth, and fifth components labeled JSC, A, B, C, and D, respectively. The data structure-type components include the job stream, the job attributes, the page attributes, and the page queue. The mass memory storage-type components include those that store the formatted pages. The data flow-type components include the job stream and the collated copies function. Any of these components may be implemented as hardware, software, firmware, some combination thereof, and so forth.

Estimator 110 provides one or more time remaining estimates to manager 125. Specifically, at (0), the time remaining estimates may be provided to a first executable-type component that is called a Job Stream Creator (JSC). The JSC is capable of creating a "hardware ready bits" job stream of printing job control data and optionally of printing job printing/image data. The JSC and/or the functions performed thereby may alternatively be performed by a component other than the manager 125.

Each printing job in the job stream is associated with printing job control data, which may include job control data and page control data. This control data may be added to the printing job in the job stream by the JSC or a different component. Job control data may include the number of collated copies and other such job-level attributes. Page control data may include media type, media size, whether or not the page is duplexed (duplex indicator), optionally the source and destination media trays (tray indicator(s)), and so forth. Page control data may additionally include whether or not the page has color (color indicator).

Each printing job in the job stream may be formulated in any of many different manners. For example, each printing job may include a Begin Job command to establish job attributes, such as the number of collated copies. Each page of a printing job may be identified by inserting a Begin Page command with the page control data. If not otherwise specified, then manager 125 may determine source and destination media trays from other attributes that are specified in the job stream along with known configuration information for the media trays of the printing device 105.

In a described implementation, within each particular printing job of the job stream, the JSC inserts a Time Remaining command that specifies the time remaining estimate(s) for the page(s) of the copy job. The JSC also inserts a Close Page command in the job stream after the printing/image data for each page of the printing job.

At (1), a second executable-type component that is called a Command Processor (and designated component A) accesses the job stream. Component A parses pages that are specified in a printer language within a printing job of the job stream. As noted above, the printing job may stipulate certain printing job attributes, such as whether or not the pages are duplexed, the media type, the media size, and the tray and source destinations.

At (2), for each page of a printing job in the job stream, component A saves in volatile memory the page attributes (e.g., as part of the processing of a Begin Page command). These page attributes may include the duplex policy, the media type, the media size, the tray source and destinations, and so forth. These are usually needed in order to prepare the print engine for printing a page.

At (3), for each page of a printing job in the job stream, component A also determines the color content of the page. If the page has any color other than black, component A notes in volatile memory that the page is a color page. Otherwise, component A notes that the page is monochrome. If the job stream includes a request for collated copies/prints, component A saves the number of collated copies to be printed in volatile memory.

At (4), when component A receives a Close Page command in the printing job of the job stream, component A enqueues the address of the memory location and invokes a third executable-type component that is called a Page Handler (and designated component B). Component B is invoked to begin the process of formatting the page into printable image strips.

At (5), typically before starting or at least completing the formatting of the page, component B invokes a fourth executable-type component that is called a Page Scheduler (and designated component C). Component C is invoked to schedule the page for printing (e.g., to add the page to the page queue). Component C enqueues the memory locations for printing, taking care to batch and enqueue duplex pages in the correct order in the page queue for the print engine duplexer. At (6), component C communicates to component B whether or not the page it has scheduled is the next page to print on the print engine.

At (7), if the page is the next page to print, component B begins sending time remaining estimates to a fifth executable-type component that is called a Print Handler (and designated component D). If the printing job includes collated copies, component B also saves the formatted page to non-volatile memory. This non-volatile memory may be a permanent inexpensive storage device such as a disk-based hard drive. Component B identifies the page to component D by the memory location that is enqueued by component C. As is described further below, component D causes the print engine 130 to prepare for printing at the appropriate time responsive to the time remaining estimates.

Each time remaining estimate may include a range of possible estimates. For example, there may be a minimum time remaining estimate, a mid-level or most-likely time remaining estimate, and a maximum time remaining estimate. Such multi-valued time remaining estimates may be considered short/optimistic, nominal, and long/pessimistic, respectively, to enable finer decision-making by component D. At (8), as a function of the trade-offs and risks for performance versus print engine wear and tear, component D selects a time remaining estimate (optionally including a selection from such multi-valued time remaining estimates) and records that estimate at the memory location corresponding to the page (e.g., in the page queue). These time remaining estimates may include time remaining updates and/or updates to original time remaining estimates. Component D also sets a timer or records the current time in order to track elapsed time with respect to the recorded time remaining estimate.

Meanwhile, asynchronous aspects of flow diagram 800 are also occurring. These asynchronous aspects are indicated by dashed lines. At (9), an asynchronous part of component D examines the page queue. Component D determines whether or not to notify print engine 130 of another page in the page queue based on a number of factors. These factors include one or more print engine characteristics, the most recent time remaining estimate(s) for a page or the most recent time remaining estimates for multiple pages, the elapsed time(s) since the estimate(s) were recorded, and so forth. Characteristic(s) of print engine 130 may include the state of the print engine (e.g., idle, still printing, just finishing printing, etc.), the timings of the print engine, the threshold times of the print engine, any one or more of these, and so forth.

Also at (9), when component D notifies print engine 130, component D establishes the attributes of the page to be printed. These page attributes are retrieved from the page queue. If the page is the first page of a duplex batch, then component D notifies print engine 130 of the entire duplex batch. Notifying print engine 130 causes print engine 130 to begin preparing for printing, if print engine 130 is not already in a ready state at that time.

At (10), while print engine 130 becomes ready for printing and/or finishes printing a previous page, component B completes the formatting of the page into printable strips. At (11), when print engine 130 is ready to receive the next page, component D invokes component B to write the printable image strips for the formatted page to print engine 130. Component B or component D can provide this formatted next page to print engine 130. At (12), component D also removes the printed pages from the page queue. This removal can occur page-by-page or at the end of each printing job.

Figure 9:
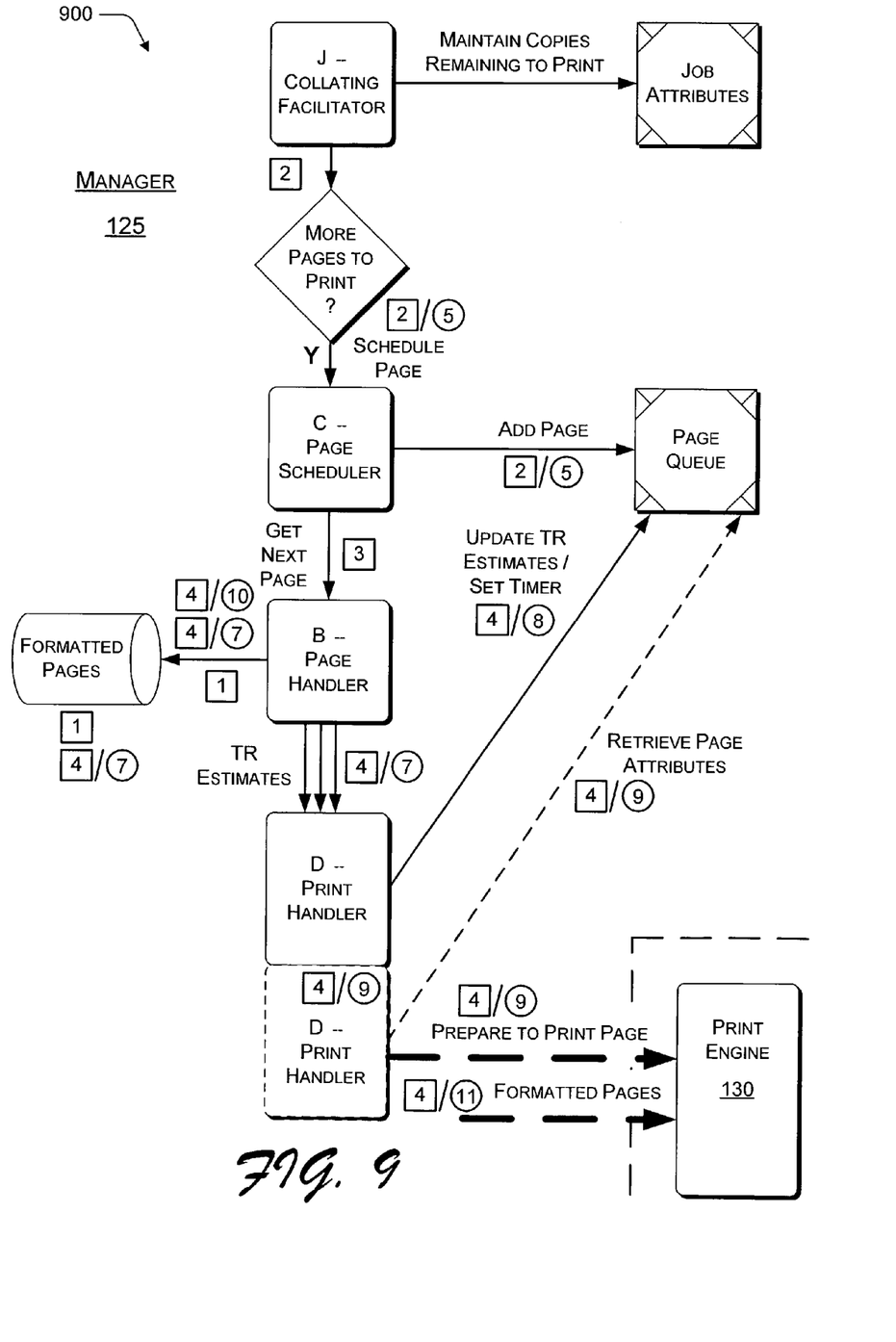
FIG. 9 is a flow diagram that illustrates an exemplary approach to managing a print engine during page processing when printing a subsequent page of the printing job in accordance with exemplary implementation(s) of the invention.

FIG. 9 is a flow diagram 900 that illustrates an exemplary approach to managing a print engine 130 during page processing when printing a subsequent page of the printing job. Flow diagram 900 shows many of the same components as flow diagram 800 (of FIG. 8). However, flow diagram 900 does omit some components to improve clarity, such as estimator 110, components JSC and A, and so forth. The encircled numerals (5) and (7) through (11) are included again.

Flow diagram 900 adds a sixth executable-type component labeled J and a data flow-type component that addresses the number of pages to be printed. The numerals [1] through [4] that are each enclosed by a square indicate and facilitate reference to specific aspects of the collating mechanism that are newly described below.

Flow diagram 900 illustrates a mechanism for handling multiple collated pages of a printing job. At [1], component B stores the formatted pages as printable strips at the non-volatile memory. It may be the same non-volatile memory as is referenced in FIG. 8 or it may be a separate memory. At [2], the sixth executable-type component that is called a Collating Facilitator (and designated component J) invokes component C. Component C is invoked by component J to schedule each page of a collated printing job, similarly to aspect (5) of FIG. 8.

At [3], after enqueuing page memory locations as in aspect (5), component C invokes component B to read the next page's printable image strips as formatted from permanent (e.g., non-volatile) storage. At [4], aspects (7) through (11) of FIG. 8 are repeated for the page being printed. It should be understood that when printing collated pages and/or other pages that are stored on slower media, the time remaining estimate(s) represent the expected time to read the page's printable image strips as formatted from the non-volatile storage, instead of the time to format the page, download the page, and so forth. Time remaining estimate(s) in these circumstances are typically a function of the size of the data and the access rate of the non-volatile storage or other media. Thus, time remaining estimates may also refer to the time to read already-processed page images from some media, such as a non-volatile disk-based form of memory.

Although implementation(s) of apparatuses, methods, systems, and arrangements have been illustrated in the accompanying Drawings and described in the foregoing Detailed Description, it will be understood that the present invention is not limited to the implementation(s) explicitly disclosed, but is capable of numerous rearrangements, modifications, substitutions, etc. without departing from the spirit and scope set forth and defined by the following claims.

What is claimed is:

1. A printing device that is capable of print engine management during page processing, the printing device comprising:

an estimator operable to provide at least one time remaining estimate, the at least one time remaining estimate relating to an expected time to complete processing of at least one page, wherein the processing of the at least one page comprises formatting the at least one page;

a print engine operable to be activated by at least one command; and a manager operable to:
accept the at least one time remaining estimate from the estimator and to provide the at least one command to the print engine;
spin up the print engine prior to completion of the processing of the at least one page if the print engine is inactive and the at least one time remaining estimate is less than or equal to a time to ready the print engine;
keep the print engine spinning prior to completion of the processing of the at least one page if the print engine is active and the at least one time remaining estimate is less than or equal to a threshold ready state maintenance time; and
spin down the print engine prior to completion of the processing of the at least one page if the print engine is active and the at least one time remaining estimate is greater than the threshold ready state maintenance time in order to reduce wear and tear on the print engine.

2. The printing device of claim 1, wherein the printing device comprises a multifunction device.

3. The printing device of claim 1, wherein the printing device comprises at least one of (i) a multifunction peripheral for a computer or (ii) a copier.

4. The printing device of claim 1, wherein the printing device comprises a multifunction device; and wherein the multifunction device includes at least one of a scanning component or a faxing component.

5. The printing device of claim 1, wherein the estimator and the manager comprise a single component.

6. The printing device of claim 1, wherein the manager is further operable to activate the print engine by providing the at least one command to the print engine.

7. The printing device of claim 1, wherein the manager is further operable to activate the print engine based on at least one of a print engine timing to transition from a first print engine state to a second print engine state, a print engine state, or a print engine threshold time.

8. The printing device of claim 1, wherein the processing of the at least one page further comprises at least one of (i) downloading the at least one page, (ii) scanning the at least one page, or (iii) receiving options entered by a user for the at least one page.

9. A method for page processing and print engine management, the method comprising:

beginning processing of a page of a printing job, wherein the processing of the page comprises formatting the page for the printing job;
determining whether a print engine is active;
providing at least one keep spinning command to the print engine prior to completion of the processing of the page if the print engine is active and a time remaining estimate for the processing of the page is less than or equal to a threshold ready state maintenance time;
providing at least one spin down command to the print engine prior to completion of the processing of the page if the print engine is active and the time remaining estimate for the processing of the page is greater than the threshold ready state maintenance time; and providing at least one spin up command to the print engine prior to completion of the processing of the page if the print engine is inactive and the time remaining estimate for the processing of the page is less than or equal to a time to ready the print engine.

* * * * *